Sept. 19, 1950         P. C. WILSON         2,523,172
ADJUSTMENT MECHANISM FOR HYDRAULIC BRAKES
Filed July 24, 1948
*Fig. 1.*
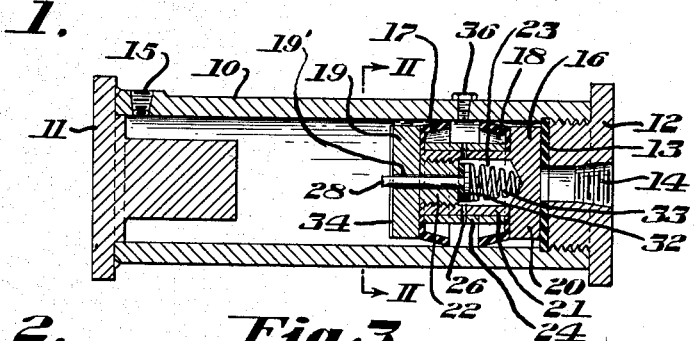
*Fig. 2.*     *Fig. 3.*
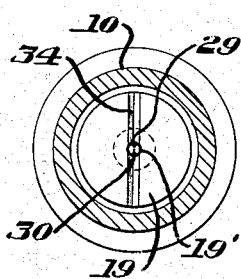 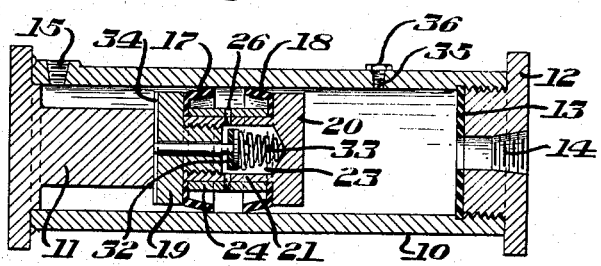
*Fig. 4.*
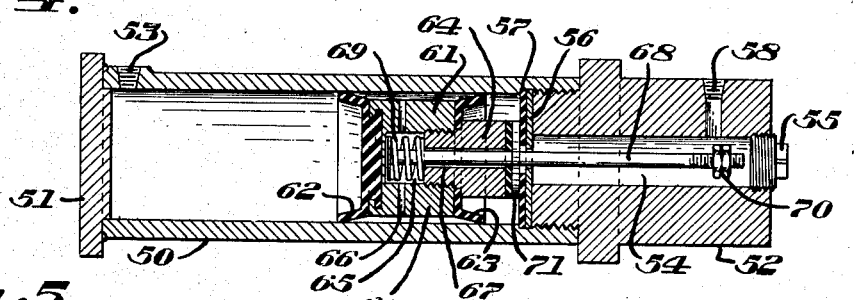
*Fig. 5.*
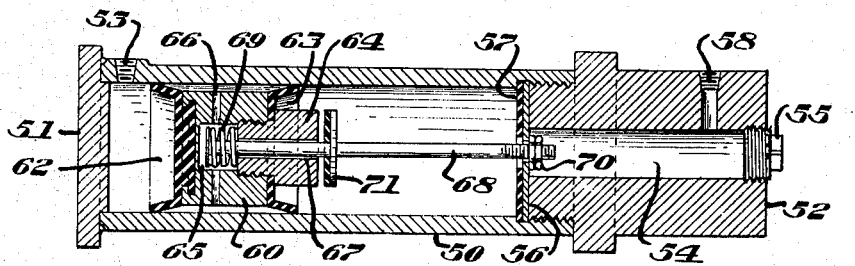
*INVENTOR.*
PALMER CLYDE WILSON
By Stebbins, Blenko & Webb,
his attys.

Patented Sept. 19, 1950

2,523,172

UNITED STATES PATENT OFFICE 2,523,172

ADJUSTMENT MECHANISM FOR HYDRAULIC BRAKES

Palmer Clyde Wilson, Uniontown, Pa.

Application July 24, 1948, Serial No. 40,473

9 Claims. (Cl. 60—54.5)

This application relates to an improvement on an invention described in my abandoned application Serial No. 769,687, filed August 20, 1947, relating to "Adjustment Mechanism for Hydraulic Brakes." In that application an adjusting mechanism is described for automatically and continuously maintaining brake shoes the correct distance from cooperating brake drums when the brakes are in the off position so that when applied the brakes will give effective braking action. Broadly speaking, the adjusting mechanism comprises a cylinder and a floating piston connected between the master cylinder and the wheel cylinders of a hydraulic brake system. The present application relates to an improved piston which may be used in such an adjusting mechanism and which permits a limited quantity of fluid to pass therethrough in one direction for adjustment purposes but provides an effective seat against any other movement of fluid past the piston in either direction.

The floating piston of my invention has oppositely extending cupped gaskets to prevent a surge of fluid past the periphery of the piston in either direction. Normally the piston floats back and forth in the adjusting cylinder in which it is positioned without allowing any fluid to escape past the piston as the brakes are applied and released. However, as the brake shoes wear, additional fluid must be supplied to the wheel cylinders for effective braking action and the piston tends to move closer to the outlet end of the adjusting cylinder which is connected to the wheel cylinders. When the piston reaches said end of the adjusting cylinder, it is necessary to allow some fluid from the master cylinder to flow past the piston toward the brake cylinder. For this purpose I provide passageways through my piston controlled by a valve so that when the floating piston is forced against one end of the adjusting cylinder by pressure of fluid from the master cylinder the valve is opened and fluid is permitted to pass the floating piston to the wheel cylinders. These passageways do not extend straight through the piston but act in conjunction with the cupped gaskets so that when the foot pedal is pressed down the fluid forced from the master cylinder may flow past the piston under control of the valve without interference from the gaskets, but when the foot pedal is released the fluid forced back from the wheel cylinders under pressure from the brake return springs is prevented from flowing past the piston by one of the gaskets, independently of any action of the valve. Since the fluid cannot pass the piston, and the piston can only move to a limited extent in the adjusting cylinder, the additional fluid in the system on the wheel cylinder side of the piston holds the shoes at the proper distance from the drums.

My piston has the further advantage of being able to withstand the tendency of fluid to escape past the piston when the brakes are suddenly applied. The inertia of the piston tends to make it lag behind the initial surge of fluid, thus imposing a load on the sealing means of the piston. This load is sustained, however, without any leak past the piston, because one of the gaskets is cupped toward the fluid to seal the periphery of the piston, and the valve is biased shut to seal the interior passageways through the piston. The valve is only open when continued pressure on the foot pedal forces the piston against the end of the adjusting cylinder connected to the brake cylinder, as described above.

In the accompanying drawing, I have illustrated certain present preferred embodiments of my invention, in which Figure 1 is a vertical section of my brake adjustor with the parts shown in position when the brakes are off;

Figure 2 is a section through the line II—II in Figure 1;

Figure 3 is a vertical section of my brake adjustor with the parts shown in position when the brakes are applied;

Figure 4 is a vertical section of a modified form of my invention with the parts shown in position when the brakes are off; and Figure 5 is a vertical section of the modified form of my invention shown in Figure 4, with the parts shown in position when the brakes are applied.

One form of a brake adjustment mechanism constructed in accordance with my invention is shown in Figures 1–3 and comprises a hollow cylinder 10 closed at one end by a head 11 and at the other end by a head 12 which has a valve seat disk 13 on its inner face. A port 14 in the head 12 opens into a conduit (not shown) from the master cylinder, and a port 15 in the cylinder 10 near the head 11 opens into a conduit (not shown) to the wheel cylinders. The master cylinder and the brake cylinders are of standard design and hence are not illustrated in the accompanying drawing.

A floating piston designated generally by the reference number 16 is contained within the cylinder 10. The piston has two cupped gaskets 17 and 18 which open toward each other and yieldingly press against the inner walls of the adjusting cylinder. Each of these gaskets has the characteristic that it will oppose the passage of fluid approaching its cupped side, but will bend and allow the passage of fluid approaching from the other side. The piston 16 has cylindrical end portions or heads 19 and 20 against the backs of the gaskets 17 and 18 respectively. The head 20 has an extension 21 in the form of a hollow cylinder and the head 19 has a cylindrical extension 22 which screws part of the way into the hollow interior of the extension 21, the remainder of said hollow interior forming a cavity 23. The gaskets 17 and 18 fit around the extension 21 and are separated by a sleeve 24 fitted over the extension 21.

Interior passageways through the piston connect the space between the gaskets 17 and 18 and the outer face of the piston head 19. Passageways 26 extend radially from the cavity 23 through the extension 21 and the sleeve 24, and an opening 19' extends axially through the piston head 19 and its extension 22 into the cavity 23.

A valve stem 28 extends through the opening 19' and longitudinal grooves 29 and 30 in the valve stem permit fluid to pass through the opening 19' along the valve stem. A valve 32 mounted on the valve stem within the cavity 23 controls the passage of fluid through the opening 19'. A compression spring 33 extends between the valve 32 and the piston head 20 to bias the valve against the opening 19' and thus to keep the opening closed except at certain times as will be later described.

When valve 32 is closed, the valve stem 28 projects beyond the piston head 19 in the direction of the cylinder head 11. When the pressure of fluid from the master cylinder forces the piston head 19 against the cylinder head 11, as shown in Figure 3, the valve stem is pushed back into the piston and the valve 32 is thereby opened. As shown in Figures 2 and 3, a transverse groove 34 across the outer face of piston head 19 forms a channel for fluid passing out of the opening 17 toward the port 15 when the head 19 is pressed against the cylinder head 11.

Air may become trapped between the opposed gaskets 17 and 18, when fluid is first fed into the system. This air may be released through a vent 35 having a cap 36.

The operation of my brake adjustment mechanism shown in Figures 1–3 is as follows: When the brakes are in off position the return springs on the brake shoes tend to force fluid out of the wheel cylinders back into the adjusting cylinder 10 through the port 15, thereby forcing the piston toward the port 14 connected to the master cylinder until it reaches the position shown in Figure 1. The gasket 18 prevents the escape of fluid past the piston toward the port 14, irrespective of the action of valve 32, because the interior passageways through the piston are all on one side of the gasket 18 and do not penetrate the piston head 20 on which the gasket 18 is mounted. However, piston head 20 is pressed against the valve seat 13 and thus adds another seal against escape of fluid past the piston toward port 14. The valve 32 is biased shut by the spring 33 so that a sudden surge of fluid from the master cylinder will not pass over the lips of gasket 18, through the radial passageways 26 into the cavity 23, and thence out through the opening 17 before the valve can close.

When the foot pedal is depressed the piston moves toward the port 15 connected to the brake cylinder, forcing fluid under pressure into the wheel cylinders and applying the brakes. Upon release of the foot pedal, the brake shoe return springs force fluid from the wheel cylinders to the cylinder 10 and return the piston to the position shown in Figure 1. During the normal movement of the piston, the valve 32 remains closed and cooperates with the gasket 17 in preventing any flow of fluid from the master cylinder past the piston, while the gasket 18 prevents any flow of fluid in the other direction.

The adjusting mechanism of the piston comes into play when the brake shoes have worn so much that the normal movement of the piston toward the port 15 does not force sufficient fluid into the wheel cylinders to apply the brakes. In that case continued pressure on the foot pedal will cause the piston to press against the cylinder head 11 until valve stem 28 is pushed inwardly to open valve 32. Fluid will then flow from the master cylinder through port 14, over the lips of gasket 18, through the radial passageways 26 into the cavity 23, and thence past the open valve 32 through the opening 19' and along the groove 34 to the port 15 and thence to the wheel cylinders. The extra fluid supplied through the valve 32 to the wheel cylinders will apply the brakes. When the brakes are released, the brake shoe return springs force fluid from the wheel cylinders back into the cylinder 10, but the extra fluid cannot return through or past the floating piston 16 because of the cupped gasket 18. Therefore when the piston 16 has moved to the position shown in Figure 1, the brake shoes will not move from the drums as much as they did before the extra fluid was added to the wheel cylinders. Decrease in the amount of the return movement of the shoes compensates for wear on the shoes so that normal clearance is maintained between the shoe and drum surfaces.

In Figures 4 and 5 I have illustrated a modification of my invention wherein the cupped gaskets face away from each other and the control valve is positioned outside of the floating cylinder instead of within it.

The modified apparatus comprises a hollow adjusting cylinder 50 closed at one end by a head 51 and at the other end by a head 52. A port 53 in the cylinder 50 adjacent the head 51 opens into a conduit to the wheel cylinders (not shown). The head 52 has an axial opening 54 therethrough which is closed at the outer end by a screw plug 55. The head 52 is threaded into the cylinder 50 and at its inner end holds a metal disk 56 and a valve seat disk 57 against the cylinder. Both disks have central openings, the opening through the abutment disk 56 being smaller in diameter than the opening 54 through the head 52. A port 58 extends through the head 52 to the opening 54 and connects with the master cylinder (not shown).

A floating piston 60 is positioned within the adjusting cylinder 50. The piston comprises a cylindrical central portion 61 with cupped gaskets 62 and 63 at each end facing cylinder heads 51 and 52, respectively. The cupped outer edges of the gaskets extend away from each other and yieldingly press against the inner cylindrical surface of the cylinder 50. An opening extends axially into the central portion 61 from its end facing the cylinder head 52, and a member 64 is screwed part of the way into said opening, leaving a cavity 65 in the interior of the piston. Radial passageways 66 extend from the cavity 65 through the member 61 to the exterior surface of the piston between the gaskets 62 and 63. An opening 67 extends through the member 64 along its central axis, and a valve stem 68 extends through the opening 67. One end of the valve stem is within the cavity 65 and carries a compression spring 69 which presses against member 64 and opposes withdrawal of the valve stem from the cavity 65. The other end of the valve stem extends through the openings in the disks 56 and 57 and into the opening 54 in cylinder head 52. The end of the valve stem in the opening 54 is threaded and carries nuts 70 which are larger in outside diameter than the opening in the abutment disk 56, so that the nuts 70 are held by disk 56 when the valve stem reaches a predetermined position in its movement toward the cylinder head 51.

The valve stem 68 fits loosely in the opening 67 so that fluid may pass between the piston cavity 65 and the interior of the cylinder adjacent its head 52. A valve 71 is mounted on the valve stem 68 between the piston member 64 and the valve seat disk 57, and seals the opening 67 when the spring 68 presses the piston member 64 toward the valve 71, as shown in Figure 4.

The operation of the modified apparatus shown in Figures 4 and 5 may be summarized as follows: When the foot pedal is released the brake shoe return springs force fluid back from the wheel cylinders and thus cause the piston to move against the cylinder head 52, as shown in Figure 4. The gasket 62 prevents any fluid from escaping past the piston toward port 58, irrespective of the action of valve 71, as valve 71 and the conduits formed by opening 67, passageways 66 and cavity 65 are all on the opposite side of gasket 62 from the fluid forced back from the brake cylinder. Moreover, valve 71 is pressed between piston member 64 and valve seat disk 56 by said fluid back pressure and thus cooperates with gasket 62 to increase the seal against escape of fluid past the piston toward port 58.

The valve 71 is biased to close opening 67 in order to avoid a surge of fluid through that opening from the master cylinder when the brakes are suddenly applied. Gasket 63 cooperates with valve 71 in preventing escape of fluid past the piston toward port 53.

The normal movement of the piston between the cylinder heads is substantially the same as that described above in the case of the piston shown in Figures 1–3. Similarly, the adjusting mechanism of the piston shown in Figs. 4 and 5 comes into play when the normal movement of the piston toward the port 53 is insufficient to apply the brakes. In that case the piston will be forced toward cylinder head 51 until nuts 70 engage the disk 56, and then the piston will continue to move against the action of spring 69 while the valve stem 68 is held stationary. In this way the valve 71 will be separated from piston member 64, and fluid under pressure from the master cylinder will pass through the opening 67 into the cavity 65, and thence out through the passageways 66 and past the gasket 62 toward the port 53 connected to the brake cylinder.

While I have described certain present preferred embodiments of my invention, it is to be distinctly understood that it may be otherwise embodied within the scope of the appended claims.

I claim:

1. In an adjustment mechanism for hydraulic brakes having a hollow cylinder with an inlet and an outlet for the flow of fluid through the cylinder and a piston slidable therein, an improved piston having an opening in one end, an opening in its side, and a passageway for fluid extending between said openings, a cup gasket adjacent each end of the piston, each gasket having a flexible flange and yieldingly pressing against the cylinder, said gaskets being positioned with the opening in the side of the piston therebetween, a valve to control the flow of fluid through the passageway, and a member connected to the valve and adapted to engage a fixed portion of the cylinder in order to open the valve, said flanges extending in opposite directions and arranged to permit flow from the inlet to the outlet past the valve when opened and one of the flanges and to prevent flow from the outlet of the inlet.

2. In an adjustment mechanism for hydraulic brakes having a hollow cylinder with an inlet and an outlet for the flow of fluid through the cylinder and a piston slidable therein, an improved piston having an opening in one end, an opening in its side, and a passageway for fluid extending between said openings, a cup gasket adjacent each end of the piston, each gasket having a flexible flange and yieldingly pressing against the cylinder, said gaskets being positioned with the opening in the side of the piston therebetween, a valve to control the flow of fluid through the passageway, means biasing the valve to close said passageway, and a member connected to the valve and movably mounted on the piston to extend therefrom so that movement of the piston may cause said member to engage a fixed portion of the cylinder and thereby open the valve, said flanges extending in opposite directions and arranged to permit flow from the inlet to the outlet past the valve when opened and one of the flanges and to prevent flow from the outlet to the inlet.

3. In an adjustment mechanism for hydraulic brakes having a hollow cylinder with an inlet and an outlet for the flow of fluid through the cylinder and a piston slidable therein, an improved piston having an opening in one end, an opening in its side, and a passageway for fluid extending between said openings, a cup gasket adjacent each end of the piston, each gasket having a flexible flange and yieldingly pressing against the cylinder, said gaskets being positioned with the opening in the side of the piston therebetween, a valve to control the flow of fluid through the passageway, a spring connected to the valve and a fixed portion of the piston to bias the valve to close said passageway, and a member connected to the valve and movably mounted on the piston to extend therefrom so that movement of the piston may cause said member to engage a fixed portion of the cylinder and thereby open the valve, said flanges extending in opposite directions and arranged to permit flow from the inlet to the outlet past the valve when opened and one of the flanges and to prevent flow from the outlet to the inlet.

4. In an adjustment mechanism for hydraulic brakes having a hollow cylinder with an inlet and an outlet for the flow of fluid through the cylinder and a piston slidable therein, an improved piston adapted to be positioned in said cylinder, said piston having an opening in the end nearest said outlet, an opening in its side, and a passageway for fluid extending between said openings, gaskets on the ends of said piston with the opening in the side of the piston therebetween, said gaskets having flexible flanges and being cupped toward each other and yieldingly pressing against the cylinder, a valve to control the flow of fluid through the passageway, and a member connected to the valve and adapted to engage a fixed portion of the cylinder in order to open the valve, said flanges being arranged to permit flow from the inlet to the outlet past one of the flanges and the valve when open and to prevent flow from the outlet to the inlet.

5. In an adjustment mechanism for hydraulic brakes an improved piston as defined in claim 4 and having means biasing the valve to close the passageway.

6. In an adjustment mechanism for hydraulic brakes an improved piston as defined in claim 4 in which the valve opening member comprises a rod connected to the valve and extending through said passageway beyond the end of the piston to engage a fixed portion of the cylinder when the piston moves toward said outlet.

7. In an adjustment mechanism for hydraulic brakes having a hollow cylinder with an inlet and an outlet for the flow of fluid through the cylinder and a piston slidable therein, an improved piston having an opening in the end nearest said inlet, an opening in its side, and a passageway for fluid extending between said openings, gaskets on the ends of said piston with the opening in the side of the piston therebetween, said gaskets having flexible flanges and being cupped away from each other and yieldingly pressing against the cylinder, a valve to control the flow of fluid through the passageway, and a member connected to the valve and adapted to engage a fixed portion of the cylinder in order to open the valve, said flanges being arranged to permit flow from the inlet to the outlet past one of the flanges and the valve when open and to prevent flow from the outlet to the inlet.

8. In an adjustment mechanism for hydraulic brakes an improved piston as defined in claim 7 and having means biasing the valve to close the passageway.

9. In an adjustment mechanism for hydraulic brakes an improved piston as defined in claim 7 in which the valve opening member extends through the passageway towards said inlet and engages a fixed portion on the cylinder when the piston moves in a direction away from said fixed portion.

PALMER CLYDE WILSON.

REFERENCES CITED

The following references are of record in the file of this patent:

UNITED STATES PATENTS

| Number | Name | Date |
|---|---|---|
| 697,140 | Goldschmidt | Apr. 8, 1902 |
| 2,345,811 | Harp | Apr. 4, 1944 |

FOREIGN PATENTS

| Number | Country | Date |
|---|---|---|
| 504,278 | Great Britain | Apr. 19, 1939 |